UNITED STATES PATENT OFFICE.

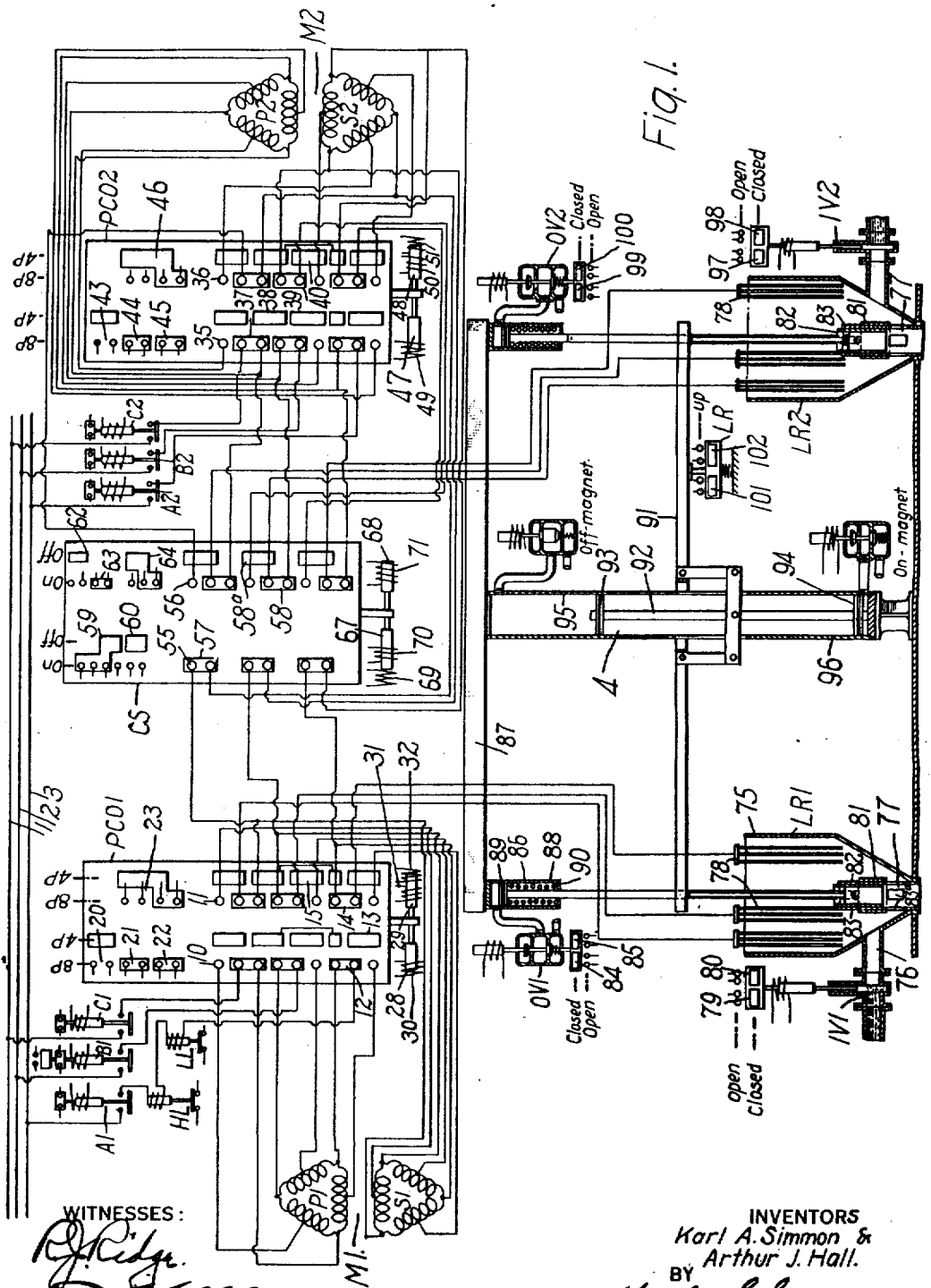

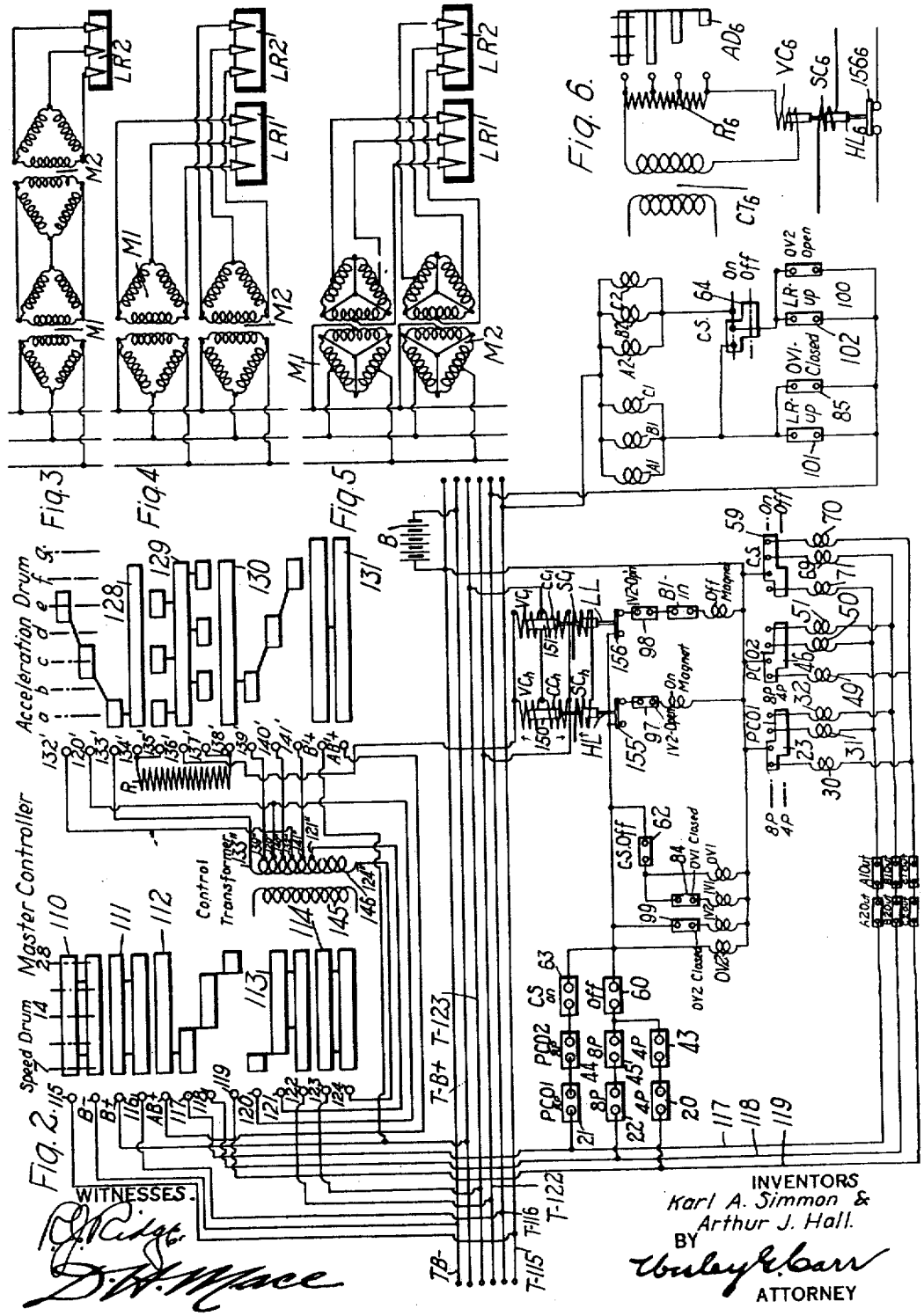

KARL A. SIMMON AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,241,568.    Specification of Letters Patent.    Patented Oct. 2, 1917.

Application filed June 20, 1914. Serial No. 846,287.

*To all whom it may concern:*

Be it known that we, KARL A. SIMMON, a citizen of the United States, and a resident of Wilkinsburg, in the county of Allegheny and State of Pennsylvania, and ARTHUR J. HALL, a subject of the King of Great Britain and a resident of Wilkinsburg, in the county of Allegheny and State of Pennsylvania, have invented a new and useful Improvement in Control Systems, of which the following is a specification.

Our invention relates to control systems for dynamo-electric machines, and it has special reference to systems that are adapted to control the operation of electric locomotives or other railway vehicles that are propelled through the agency of polyphase induction motors.

One of the objects of our invention is to provide a system of control of the above indicated class, which shall be simple in arrangement and effective and reliable in operation and which may be installed and maintained at relatively low expense.

Another object of our invention is to provide a system of the multiple unit type by means of which a plurality of polyphase induction motors may be arranged for different ranges of speed and may be automatically governed in accordance with circuit conditions.

A still further object of our invention is to provide a system of the type referred to, which is adapted to automatically control the acceleration of the driving motors, and to make provision for selectively adjusting the control apparatus, whereby any desired rate of acceleration may be effected.

A further object of our invention is to provide a system of control for railway motors which shall be peculiarly adapted for the control of electric locomotives employed upon railway or electrified railroads having heavy grades and congested traffic where severe service conditions are encountered and where economics of operation may be realized by regeneration of energy to the distributing system on down grades or in stopping.

In another aspect, one of the objects of our invention is to simplify and improve the arrangement of circuits and the mode of operation of the system of control set forth in a co-pending application, Serial No. 820,817, filed February 25, 1914, by Benjamin G. Lamme, and assigned to the Westinghouse Electric and Manufacturing Company, and to provide a system of this class which shall be electrically operated and automatically governed, and, moreover, shall be adapted to control the motors of a single vehicle or a plurality of similar vehicles, as is common in systems of the well-known multiple unit type.

In accordance with our invention, we employ a plurality of polyphase induction motors which may be arranged for different numbers of poles and may be connected either in cascade or parallel relation by means of a plurality of electrically operated switches. The operation of the motors is governed by means of a plurality of liquid rheostats which are automatically controlled in accordance with the motor current through the agency of electro-responsive devices or "limit switches" which are provided with a plurality of auxiliary coils by means of which the limit switches may be adjusted for different current values by a suitable master controller.

Our invention may best be understood by reference to the accompanying drawings, in which Figure 1 is a diagrammatic view of a system of electric motor control embodying our invention, the main circuit connections and switches and the control apparatus which are directly associated therewith being shown completely, while the control circuits are omitted for the sake of clearness. Fig. 2 is a diagrammatic view of the control circuit connections and control apparatus, including the energizing coils and interlock switches shown in Fig. 1. The several interlock switches are distributed throughout the diagram for the sake of simplicity and clearness, in lieu of being indicated in connection with the apparatus with which they are actually associated and by which they are actuated. By so doing, it is believed that a more ready understanding of the system and its mode of operation may be had, while unnecessary complications in the circuit connections are avoided. Figs. 3, 4 and 5 are simplified diagrammatic views showing the arrangement and circuit connections of the motors for three different ranges of speeds, and Fig. 6 is a diagrammatic view of a modified type of adjustable limit switch.

We shall first set forth the main circuit connections and apparatus and the general mode of operation thereof, after which the control circuit connections and operation will be discussed.

Referring to Fig. 1, the system shown comprises a plurality of supply circuit conductors 1, 2 and 3 which are adapted to deliver polyphase alternating current energy to a plurality of polyphase induction motors M1 and M2, a plurality of line switches A1, B1, C1 for connecting the conductors 1, 2 and 3 to motor M1, a plurality of line switches A2, B2 and C2, interposed between the supply circuit conductors 1, 2 and 3 and the motor M2, pole change-over switches PC01 and PC02 for arranging the winding connections of the motors M1 and M2 for different numbers of poles, a cascade switch CS for connecting motors M1 and M2 either in cascade relation or in parallel circuit, a plurality of liquid rheostats LR1 and LR2 adapted to be connected in the secondary circuits of the motors M1 and M2 for governing the acceleration and operation thereof, and an operating mechanism 4 for actuating the liquid rheostats LR1 and LR2.

The motors M1 and M2 are of the three-phase, wound rotor, induction type and respectively embody primary windings, P1 and P2 and secondary windings S1 and S2. Initially, the windings are connected in delta relation, and the external circuits are connected to the points of common connection, under which conditions the motors are adapted for a particular number of poles, for instance, eight poles, while the windings are further provided with taps at substantially their mid-points by means of which the number of poles of the motors may be halved, if desired, thereby producing a four-pole machine. Inasmuch as connections for adapting motors for different numbers of poles are old, no further description thereof is deemed necessary.

The pole change-over switch PC01 comprises a plurality of sets of stationary contact terminals 10 and 11 and coöperating movable contact segments 12, 13, 14 and 15 which are adapted to make engagement therewith upon the position-indicating lines 8P and 4P, the change-over switch being adapted to occupy two positions, one for arranging the motor M1 for eight poles and the other for four poles. The switch PC01 embodies, also a plurality of interlock switches 20, 21, 22 and 23 which comprise coöperating relatively movable contact members that are also adapted for engagement upon the position-indicating lines hereinbefore referred to.

Each of the several interlock switches will be designated by a single numeral which indicates the movable conducting segment thereof, and, for the sake of clearness, said switches will be hereinafter referred to by their numeral, together with the main switch with which they are associated and the position of said switch, in which engagement between the coöperating members is effected, for instance, interlock switch 23—JC01—8P indicates that conducting segment 23 of pole change-over switch PC01 engages its coöperating stationary terminals when said switch occupies its position 8P.

The switch PC01 is adapted to be electrically actuated by means of electromagnets 28 and 29, electromagnet 28 being provided with a single energizing coil 30—PC01—4P and magnet 29, with a plurality of coils 31—PC01—8P and 32—PC02—8P.

The pole change-over switch PC02 is similar in construction to switch PC01 and embodies a plurality of sets of stationary contact terminals 35 and 36, coöperating sets of conducting segments 37, 38, 39 and 40, a plurality of interlock switches 43, 44, 45 and 46 and a plurality of operating electromagnets 47 and 48 which respectively are provided with energizing coils 49—PC01—4P, 50—PC02—8P and 51—PC02—8P.

The cascade switch CS is also of a similar construction to those just described and embodies a plurality of sets of stationary contact terminals 55, and 56, sets of coöperating movable segments 57, 58 and 58ª, a plurality of interlock switches 59, 60, 62, 63 and 64, electromagnets 67 and 68, respectively provided with energizing coils 69—CS—off, 70—CS—off and 71—CS—on.

The liquid rheostat LR1 comprises a tank 75 having an inlet opening 76 and a discharge opening 77 and a plurality of electrodes 78. The inlet opening 76 is provided with an electrically operated inlet valve IV1 and interlock switches 79 and 80. Associated with the discharge opening 77 are a plurality of concentrically related valves 81 and 82. The discharge valve 81 surrounds a tubular member 83 which is secured to the edges of the discharge opening 77 and is provided with a plurality of openings 83ª near its lower end, and said discharge valve 81 is adapted to be moved downwardly to close the openings 83ª. The valve 82 is the regulating valve and is slidably fitted within the tube 83 and adapted to be raised and lowered to fix the height of the electrolyte within the rheostat, it being understood that the electrolyte is continuously admitted to the rheostat when the inlet valve IV1 is opened, and the excess thereof over flows and is discharged through the regulating valve 82 and discharge opening 77. The discharge valve 81 is mechanically associated with a pneumatic operating device 86 which is conveniently fastened to a supporting member 87.

The device 86 comprises a cylinder 88 containing a movable piston 89 which is normally held in its upper position by a spring 90. An electrically operated outlet valve OV1 governs the admission of operating fluid thereto from a suitable source (not shown) and is provided with interlock switches 84 and 85. The valve OV1, when deënergized, is closed and cuts off the supply of operating fluid, while establishing a communication between the cylinder 86 and the atmosphere.

The liquid rheostat LR2 is similar in all respects to rheostat LR1, and no description thereof will be given. The inlet valve IV2 controls the admission of electrolyte to the rheostat, while an electrically operated outlet valve OV2 is attached to the member 87 and controls the discharge thereof, in the same manner as set forth in connection with the operation of the valves IV1 and OV1.

The regulating valves 82 of rheostats LR1 and LR2 are mechanically associated with the ends of a common supporting member 91 that is associated with a piston rod 92 having end pistons 93 and 94 which are movable within a plurality of operating cylinders 95 and 96, respectively. The lower end of the operating cylinder 96 is provided with an electrically operated valve marked "On magnet," which, when deënergized, establishes a communication between the cylinder 96 and the atmosphere, and, when energized, admits operating fluid thereto. An electrically operated valve marked "Off magnet," is connected to the upper end of the cylinder 95 and, when deënergized, is open to admit operating fluid into said cylinder. Under normal conditions, therefore, when both the "on magnet" and the "off magnet" are deënergized, pressure is released beneath the piston 94 and admitted above the piston 93, whereby the regulating valves 82 of the several rheostats LR1 and LR2 are maintained in their lowest positions. When both the magnets are energized, the reverse conditions obtain and and the regulating valves 82 are moved upwardly. When only the "on magnet" is energized, balanced pressures obtain on opposite sides of the pistons 93 and 94, and the mechanism is maintained at rest. The apparatus, as a whole, is termed a "balanced pressure operating mechanism."

The inlet valve IV2 is provided with a plurality of interlock switches 97 and 98, while the outlet valve OV2 is provided with interlock switches 99 and 100. Moreover, a plurality of interlock switches 101—LR—*up* and 102—LR—*up* coöperate with the cross arm 91 which operates the regulating valves 82, and said interlock switches are normally open when the regulating valves 82 are in their lowest positions and are subsequently closed, as soon as the cross arm 91 is initially raised. The interlock switches associated with each of the inlet and outlet valves are open when their associated valves are closed, and are closed when their respective valves are opened. Hereinafter, the several interlock switches referred to, will be designated by their numeral, together with the valve with which they are associated and the position of the valve in which the switch is closed, as for instance, interlock switch 79—IV1—*open*.

Having set forth the arrangement of apparatus and the structural details thereof, we shall now describe in a general way, the main circuit connections, irrespective of the means and manner by which, and in which, said apparatus is actuated and controlled.

Assuming the main circuit connections to be as shown in Fig. 1, the motors M1 and M2 are connected in cascade arrangement, with the secondary windings S2 of motor M2 connected to the secondary windings S1 of motor M1 and the primary windings P2 of motor M2 connected to the rheostat LR2. Moreover, the windings of the several motors are connected for their larger number of poles; namely, eight poles, and hence the cascade arrangement gives the equivalent of sixteen poles. This constitutes the lowest speed connection which, it will be assumed, is adapted to produce a speed of approximately seven miles per hour.

In the copending application, hereinbefore referred to, the pole change-over switches PCO1 and PCO2 and the cascade switch CS, and their circuit connections and mode of operation are fully described and, therefore, we shall not attempt to give a detailed description thereof nor to trace the circuits which are manipulated thereby. The switches PCO1, PCO2 and CS are similar to the corresponding switches in the application referred to, except that they are provided with suitable interlock switches and are operated electrically by means of electromagnets.

Having established the cascade connection of the motors M1 and M2, outlet valve OV2 is energized to effect the closure of the discharge opening 77 of rheostate LR2 and, subsequent thereto, the inlet valve IV2 is opened to permit the continuous flow of electrolyte into the rheostat. Thus, the level of the electrolyte is raised to the "flush level" or a height corresponding to the upper end of the regulating valve 82, at which height the electrodes 78 are partially immersed. Concurrently with the opening of the inlet valve IV2, the line switches A1, B1 and C1 are closed, to connect the supply circuit conductors 1, 2 and 3 to the primary windings P1 of the motor M1 before the "flush level" is established.

Having thus connected the motors to the source of energy, said motors are started into operation and may be accelerated by gradually raising the level of the electrolyte within rheostat LR2, whereby the resistance in the primary windings P2 of motor M2 is gradually excluded. The elevation of the electrolyte is, of course, effected by raising the regulating valve 82 through the agency of the balanced pressure operating mechanism, it being understood that said mechanism is caused to actuate said valve by energizing the "off magnet" and the "on magnet", whereby operating fluid is admitted beneath piston 94 and released above the piston 93. The movement of regulating valve 82 and hence the motor acceleration may be arrested by deënergizing the "off magnet", whereby balanced pressures acting upon the pistons 93 and 94 are obtained.

Having raised the electrolyte to its maximum height, all of the resistance is excluded from the primary or acting secondary circuit of motor M2, and full speed for this particular connection of motors is obtained; namely, seven miles per hour. This is the first running position, and the motor circuit connections are shown in Fig. 3.

In order to increase the motor speed, the valves OV2 and IV2 are deënergized to permit the opening of the discharge valve 81 and the closure of the inlet valve IV2 of rheostat LR2. The "off magnet" and the "on magnet" are also deënergized and the motor circuit is interrupted through rheostat LR2, while line switches A1, B1 and C1 subsequently are opened. Thus, the motors are disconnected from the source of energy and the electrolyte is discharged from the rheostat LR2, while the regulating valve 82 and the balanced pressure operating mechanism assume their initial positions.

Maintaining the pole change-over switches PCO1 and PCO2 in the same position, the cascade switch CS is moved to its "off" position, whereby the motors M1 and M2 are connected in parallel and arranged for their larger number of poles; namely, eight poles. Both the outlet valves OV1 and OV2 are then energized to effect the closure of the discharge valves 81 of the rheostats LR1 and LR2, after which both inlet valves IV1 and IV2 are opened, and, concurrently therewith, the line switches A1, B1 and C1 and A2, B2 and C2 are closed before the "flush level" is established. Thus, energy is supplied to the motors M1 and M2 which are connected in parallel and independently to the rheostats LR1 and LR2. To increase the motor speed, the balanced pressure operating mechanism is actuated to raise the regulating valves 82, whereby the electrolyte level is increased and the secondary resistance correspondingly decreased until the maximum height of the electrolyte is reached. The motors M1 and M2 are then connected in multiple to the supply circuit, with their larger number of poles; namely eight. This is the second running position and the main motor circuit connections are shown in Fig. 4, these connections being adapted to effect a speed substantially double that of the first arrangement of circuits; namely, fourteen miles per hour.

A still further range of operating speeds may be obtained by again emptying the rheostats LR1 and LR2 of electrolyte and then opening the line switches, as hereinbefore described, after which the pole change-over switches PCO1 and PCO2 are moved into their four-pole positions 4P, whereby the windings of the motors M1 and M2 are re-arranged to halve the number of poles, thus producing four-pole machines. The cascade switch CS remains in its "off" position, whereby a multiple arrangement of the motors M1 and M2 is secured.

Subsequent to arranging the motors for multiple operation and four-pole connections, the outlet valves OV1 and OV2, the inlet valves IV1 and IV2 and the line switches A1, B1, C1 and A2, B2 and C2 are actuated in the manner already set forth. Energy is thus supplied to the motors M1 and M2, and they may be brought up to speed by raising the level of the electrolyte within the rheostats LR1 and LR2 until its maximum height is reached. Under these conditions, the motors M1 and M2 are connected in multiple arrangement with four poles each with all their secondary resistance excluded. This is the third or full-speed operating position and is adapted to effect a speed of twenty-eight miles per hour, and the connections of the motors are shown in Fig. 5.

It will be seen, therefore, that the motors may be arranged for three ranges of operating speeds; first, from zero to seven miles an hour with eight pole connections and cascade arrangement; second, from seven to fourteen miles an hour with eight pole connections and multiple arrangement, and third, from fourteen to twenty-eight miles an hour with four pole connections and multiple arrangement.

Having considered, in a general way, the main motor circuit connections and the mode of operation, reference may be had particularly to Fig. 2, showing the auxiliary control circuit connections which will now be discussed.

Among the control apparatus is a "master controller" comprising two parts, one marked "Speed drum" and the other marked "Acceleration drum". The "speed drum" comprises a plurality of movable contact segments 110, 111, 112, 113 and 114 which are adapted to engage a plurality of stationary contact terminals 115, B—, B+, 116, AB+, 117, 118, 119, 120, 121, 123 and 124 upon the position-indicating lines 7, 14 and 28, corresponding to the several speed connections; namely, seven, fourteen and twenty-eight miles per hour.

The "acceleration drum" comprises a plurality of movable contact segments 128, 129, 130 and 131 which are adapted for coöperative engagement with a plurality of stationary contact terminals 132', 120', 133', 134', 135', 136', 137', 138', 139', 140', 141', B'+ and AB'+ upon the position-indicating lines $a$, $b$, $c$, $d$, $e$, $f$ and $g$ for the purpose of governing the connections of a plurality of electro-responsive devices or limit switches HL and LL, with respect to a "control transformer" or other suitable source of auxiliary energy, through a preventive resistor R.

The "control transformer" is preferably energized from certain of the supply circuit conductors 1, 2 and 3 and comprises a primary winding 145 and a secondary winding 146, the secondary winding having a plurality of taps, 133'', 139'', 120'', 140'', 132'', 141'', 121'' and 124'', which are associated with certain of the stationary contact terminals of the "speed drum" and "acceleration drum" which are designated by corresponding reference numerals.

The high and the low limit switches HL and LL are respectively provided with main energizing series coils $SC_h$ and $SC_l$ which are connected in series circuit with one of the primary motor leads which is controlled by the line switch A1. Thus, the current limits HL and LL are rendered responsive to the primary motor current and operate in a well-known manner. The current limit HL is provided with a plurality of auxiliary energizing coils $VC_h$ and $CC_h$ which coöperate with a common core 150 and act in opposition, the one to the other. The limit LL is similarly provided with two auxiliary coils $VC_l$ and $CC_l$, adapted to act in common upon a core 151 in the same manner as already described. The limits HL and LL are respectively termed the "high limit" and the "low limit" and are adjusted for different current values between which it is desired to maintain the accelerating motor current. The excitation of the auxiliary coil $VC_h$ of the high limit HL and also of the coils $VC_l$ of the low limit LL may be varied at will by the operator through the agency of the "acceleration drum" by means of which said coils are connected across any portions of the "control transformer" secondary winding 146. The coils $CC_h$ and $CC_l$ of the limit HL and LL are also energized from the "control transformer," and the degree of energization is dependent upon the position of the "speed drum," the contact segments of which are arranged to give a constant excitation to said coils for each speed position thereof.

It is evident, therefore, that the effective adjustment and operation of the limits HL and LL is dependent upon the degree of excitation of their associated auxiliary coils and, moreover, this excitation may be varied at will by the operator. The limits HL and LL are respectively provided with coöperating switch members 155 and 156 that are respectively connected in circuit with the energizing coils of the "on-magnet" and the "off-magnet." Hence, said current limits are adapted to automatically control the operation of the balanced pressure operating mechanism which serves to determine the height of the electrolyte in the liquid rheostats LR1 and LR2 and the rate of motor acceleration. The rate of acceleration may, therefore, be selected by the operator within limits, which are determined by the various positions of the "acceleration drum."

Assuming the circuit connections and apparatus to be as shown in Figs. 1 and 2, the operation of the system, as a whole, is as follows: The "speed drum" of the "master controller" is first moved into its position 7, and the "acceleration drum" is moved to one of its positions, for instance, position $a$, whereby the motor circuit connections are established for the first range of operating speeds, as shown in Fig. 3. In the position 7, a circuit is completed from the positive side of the battery B which includes train line conductor T—B+, contact terminal B'+ and AB'+ of the "acceleration drum" which are bridged by the conducting segment 131, contact terminals AB+ and 117 which are bridged by the conducting segment 112 of the "speed drum," and, inasmuch as the pole change-over switches PCO1 and PCO2 and the cascade switch CS occupy their proper positions for effecting a cascade arrangement of motors with eight pole connections, the circuit is completed through interlock switches 21— PCO1—8P, 44—PCO2—8P, 63—CS—on, and thence through the energizing coil of outlet valve OV2 to the negative side of the battery B. The outlet valve OV2, being thus energized, is actuated to effect the closure of discharge valve 82 of the rheostat LR2, and, in so doing, its associated interlock switches 99 and 100 are closed. Thus, a circuit is completed from the negative side of the interlock switch 63—CS—on, through interlock switch 99—OV2—closed and the energizing coil of inlet valve IV2 to the battery. The inlet valve IV2 is therefore opened to admit electrolyte into the rheostat LR2, which rapidly rises until the tips of the electrodes 78 are immersed. The opening of the outlet valve OV2 also completes a circuit from the terminal B+ of the "speed drum" which includes conducting segment 111, terminal 116, train line conductor T—116, interlock switch 100—OV2—*open*, interlock switch 64—CS—*on*, energizing coils of line switches A1, B1, and C1, train line conductor T—115, contact terminal 115, and conducting segment 110 to the contact terminal B—. Thereupon, the line switches A1, B1 and C1 are closed before the "flush level" is reached and the motors M1 and M2 are started into operation.

The closure of line switch B1 serves to complete the energizing circuit of the "off magnet" from the negative side of interlock switch 63—CS—*on* through switch member 156 of limit LL, and interlock switches 98—IV2—*open* and B1—*in*, while the coil of the "on-magnet" already has been energized through the switch member 155 of limit HL and interlock switch 97—IV2—*open*.

Assuming that the "acceleration drum" occupies its position *a*, a circuit is completed from the upper tap 133" of the "control transformer" which includes terminal 133', contact segment 128, terminal 134', terminal 135', contact segment 129, terminal 136', auxiliary coils $VC_h$ and $VC_l$ of the respective limits HL and L, train line conductor T—123, contact terminal 123, conducting segment 114, and contact segment 124 to the lowest tap 124" of the "control transformer". The coils $VC_h$ and $VC_l$ are therefore connected across the entire secondary winding 146 of the "control transformer". At the same time, a circuit is completed from tap 120" of the "control transformer", through terminals 120 and 122 of the "speed drum" which are bridged by conducting segment 113, train line conductor T—122 and auxiliary coils $CC_h$ and $CC_l$ of the respective limits HL and LL to "control transformer" tap 124" through the circuit already traced. The coils $CC_h$ and $CC_l$ are therefore connected between the taps 120" and 124" of the "control transformer".

The limits HL and LL are therefore adjusted for a particular motor current which traverses their series coils $SC_h$ and $SC_l$ and hence, will operate in accordance with the motor current to automatically govern the operation of the balanced pressure operating mechanism and the liquid rheostats LR1 and LR2.

Having completed the circuits hereinbefore traced, the "on-magnet" and the "off-magnet" are both energized, whereby operating fluid is admitted to the cylinder 96, thereby raising the regulating valve 82 of the liquid rheostat LR2, provided, of course, that the motor current does not exceed the value for which the low limit LL is adjusted. In case the motor current becomes sufficiently great to raise the lower limit LL, the "off-magnet" is deënergized and fluid pressure is admitted to the upper cylinder 95, whereby balanced pressure conditions result, thus arresting further movement of the regulating valve 82. If, for any reason, the current should be so abnormal as to raise the high limit HL, then the "on-magnet" is also deënergized, whereby pressure is released from the cylinder 96 and the valves 82 are therefore lowered in position by reason of the unbalanced pressure conditions in the cylinders 95 and 96. This downward movement continues until the current has been reduced to such a value as to permit the high limit HL to again drop to its initial position in which the "on-magnet" is again energized, and balanced pressure conditions restored. If the current becomes reduced sufficiently to permit the low limit LL to again drop, the "off-magnet" is energized, and the resulting unbalanced conditions cause the regulating valve 82 to be raised as before. The operation, therefore, of the liquid rheostats is rendered entirely automatic and dependent upon the particular motor current value for which the limits HL and LL are adjusted. The operation will therefore proceed automatically until the maximum level of the electrolyte is obtained, which gives the full running speed for that particular arrangement of motor circuits.

If, during the operation, the operator desires a greater rate of acceleration, for any reason whatsoever, he may move the "acceleration drum" to any of its other positions, depending upon the rate desired, such for instance, as position *b*. In this position, the connections of the coils $VC_h$ and $VC_l$ are shifted from tap 133" on the "control transformer" to the tap 139", the preventive resistor R being employed in the usual manner during the transition of connections. Thus, the excitation of the coils $VC_h$ and $VC_l$ is reduced and, consequently, the current value for which the limits HL and LL are adjusted, is correspondingly increased. It is clear, therefore, that the rate of acceleration will also be increased. Without further description, it will be understood that other greater rates of acceleration may be obtained by moving the "acceleration drum" to any of its other positions or successively through its positions *c, d, e, f* and *g*, in which case the connections of the coils $VC_h$ and $VC_l$ to the "control transformer" are progressively made to taps 120", 140", 132" and 141".

In order to further increase the motor speed, it is necessary to rearrange the connections of the motors M1 and M2 and hence, the "speed drum" is moved to its position 14, in which contact terminal 117 disengages the conducting segment 112 and, hence, the coils of the outlet valve OV2, the inlet valve IV2 and the "on-magnet" and "off-magnet" are deënergized. Thus, the inlet valve IV2 is closed and the discharge opening 77 of rheostat LR2 is opened, whereby the electrolyte within the rheostat is permitted to be discharged to interrupt the motor circuit. Inasmuch as the "off-magnet" and the "on-magnet" are deënergized, the balance pressure operating mechanism also is moved to its lowest position and, in so doing, it opens the interlock switches 101—LR—*up* and 102—LR—*up* just prior to its lowest point of travel. The interlock switch 100—OV2—*open* being already open, the line switches A1, B1 and C1 are deënergized and caused to disconnect the motors M1 and M2 from the source.

As soon as the "speed drum" occupies its position 14, a connection is established from terminal AB+, through contact segment 112, terminal 118, interlock switches B2—*out* and B1—*out*, electromagnet 69—*on* of the cascade switch CS, and interlock switch 59—CS—*on* to the battery. The cascade switch CS, therefore, is actuated into its "off" position, whereby the motors M1 and M2 are connected in multiple relation and the cascade connection thereof is discontinued. No changes are effected in the arrangement of motor windings and, therefore, the motors are still connected for eight poles.

Upon the movement of the cascade switch CS, a circuit is completed from terminal 118 of the "speed drum" which includes interlock switches 22—PCO1—8P, 45—PCO2—8P, and 60—CS—*off*, where the circuit divides, one branch including energizing coil of outlet valve OV2 and the other branch including interlock switch 62—CS—*off* and energizing coil of outlet valve OV1 to the battery.

Upon the completion of the circuit just traced, the outlet valves OV1 and OV2 are energized, and the discharge valves 81 of the respective rheostats LR1 and LR2 are closed. After the outlet valves are actuated, their associated interlock switches 99—OV2—*closed* and 84—OV1—*closed* are closed to complete circuits through the energizing coils of the inlet valves IV1 and IV2. Thus, these valves are actuated and the respective inlet openings 76 are opened up to permit the admission of electrolyte into the rheostats LR1 and LR2. Thereupon, the electrolyte quickly rises to a level corresponding to the upper end of the regulating valves 82, whereby the electrodes are partially immersed.

Concurrently with the action just described, the actuation of the outlet valves OV1 and OV2 also causes their respective interlock switches 85 and 100 to be closed, whereby multiple circuits are completed from the train line conductor T—116, one of which includes interlock switch 85—OV1—*closed* and the energized coils of line switches A1, B1 and C1 and thence to the negative side of the battery B, and the other includes interlock switches 100—OV2—*open*, 64—CS—*off* and the energizing coils of line switches A2, B2 and C2 to the battery. Following the energization of these line switches, said switches are closed to connect the motors M1 and M2 in multiple relation to the supply circuit conductors 1, 2 and 3, after which the "off-magnet" and "on-magnet" becomes operative to govern the balanced pressure operating mechanism.

The motors, therefore, are started into operation and are accelerated at a uniform rate dependent upon the position of the "acceleration drum" which has been assumed to be position *a*. It will be understood that the limits HL and LL will serve their intended functions in governing the automatic operation of the balanced-pressure operating mechanism in the manner hereinbefore described, whereby the level of the electrolyte within the rheostats LR1 and LR2 will be gradually raised in accordance with the motor current.

It should be noted, however, that the value of motor current for which the limits HL and LL are now adjusted has been materially lowered to meet the conditions required by the multiple arrangement of motors. This change of adjustment is effected by the "speed drum," inasmuch as the contact terminal 120 and conducting segment 113 are disengaged in its second position 14, in which a circuit is completed from contact terminal 122 through conducting segment 113 to contact terminal 121 and thence to tap 121'' of the "control transformer." Thus, the auxiliary coils $CC_h$ and $CC_l$ of the respective limits HL and LL are connected between taps 121'' and 124'' of the "control transformer." The opposing action of these auxiliary coils to the main series coils $SC_h$, $SC_l$ is, therefore, reduced, whereby these series coils become effective in raising their respective switch members 155 and 156 from their coöperating stationary terminals under lower current conditions.

Obviously, any desired rate of automatic acceleration may be secured by moving the "acceleration drum" to its proper position, whereby the energization of the variable auxiliary coils $VC_h$ and $VC_l$ may be changed at will.

Assuming now that the motors M1 and M2 have been automatically brought up to their full running speed corresponding to the motor connections effected by position 14 of the "speed drum," said connections being shown in Fig. 4, the speed may be further increased by moving the "speed drum" to position 28.

By so doing, the disengagement of contact terminal 118 and conducting segment 112 is effected, whereby the outlet valves OV1 and OV2, the inlet valves IV1 and IV2 and the "on-magnet" and the "off-magnet" are deënergized. Consequently, the admission of electrolyte is cut off, and the electrolyte within the rheostats is discharged, thereby interrupting the motor circuits, while the balanced-pressure operating mechanism is lowered to its initial position, as will be understood. When the outlet valves OV1 and OV2 are deënergized, and the arm 91 of the balanced-pressure operating mechanism reaches substantially its lower end of travel, the interlock switches 101—LR—*up*, 85—OV1—*closed*, 102—LR—*up* and 100—OV2—*closed* are opened, whereby the electrically operated line switches A1, B1 and C1 and A2, B2 and C2 are deënergized and permitted to disconnect the motors M1 and M2 from the source of energy.

Having opened the line switches, as described, a circuit is completed from terminal AB+ of the "speed drum" which includes conducting segment 112, terminal 119, interlock switches C2—*out* and C1—*out* where the circuit divides, one branch including energizing coil 30—4P of pole change-over switch PCO1 and interlock switch 23—PCO1—8P to the battery, while another circuit is completed through energizing coil 49—4P of pole change-*over* switch PCO2 and interlock switch 46—PCO2—8P to the battery. The operating magnets 28 and 47 of the respective pole change-over switches PCO1 and PCO2 are, therefore, energized and said switches are moved into their positions marked 4P, whereby the windings of the several motors M1 and M2 are rearranged and adapted for four poles.

The cascade switch CS remains in its "off" position, so that the motors M1 and M2 are connected in multiple relation with four poles instead of eight poles. As soon as the switches PCO1 and PCO2 occupy their 4P position, a circuit is established from contact terminal 119 of the "speed drum" which includes interlock switches 20—PCO1—4P, 43—PCO2—4P, 60—CS—*off* and thence, through the energizing coils of outlet valves OV2 and OV1 in multiple, to the battery. The discharge valves 81 then close, and, subsequently, the coils of the inlet valves IV2 and IV1 are energized through the respective interlock switches 99—OV2—*closed* and 84—OV1—*closed*, as hereinbefore set forth.

Inasmuch as the rest of the operation and circuit connections are similar to those already described in connection with the second speed position 14 of the "speed drum", no further detailed description thereof is deemed necessary.

It will be understood that, as soon as the valves OV1 and OV2 are open, the valves IV1 and IV2 are open and the line switches A1, B1 and C1, and A2, B2 and C2 are closed to connect the motors to the source of energy. Immediately following the opening of the inlet valve IV2 and the closure of line switch B1, the "off" and the "on" magnets are energized in accordance with the action of the high and low limits HL and LL. The automatic operation of the rheostats LR1 and LR2, therefore, proceeds as before and at a rate which is determined by the position of the "acceleration drum", until full running speed is attained.

The operation of the system may be discontinued at any time by moving either the "speed drum" or "acceleration drum" to their respective "off" positions, whereby the energizing circuit for the outlet valves OV1 and OV2, the inlet valves IV1 and IV2 and the "on magnet" and "off magnet" is interrupted, either by conducting segment 131 which bridges contact terminals B'+ and AB'+ of the "acceleration drum" or by conducting segment 112 which bridges terminals AB+ and 117, 118 and 119 of the "speed drum". The interruption of the energizing circuit by either of the drums will, therefore, cause the motors to be disconnected from the supply circuit, and the balanced-pressure operating mechanism to be moved to its initial position.

In order to decrease the speed of the motors M1 and M2 from one of the high-speed positions of the "speed drum", the operation is substantially like that described heretofore and merely necessitates the manipulation of the "speed drum" to the desired lower-speed position which causes the electrolyte to be emptied from the rheostats, the line switches to be opened, the pole change-over switches and cascade switch to be moved to their proper positions and, subsequently, the motors reconnected to the source and the automatic operation resumed, during which action energy is regenerated to the supply circuits until substantially synchronous speed is attained.

This system of control is particularly adapted for the utilization of the driving motors M1 and M2 as generators, being driven by the inertia of the vehicle or locomotive for the regeneration of energy to the source. The regenerative action of the motors may be effected at any time when the speed thereof is greater than the normal speed of the motors corresponding to the particular arrangement of motors and circuit connections established. In other words, energy may be regenerated to the source whenever the motor speed exceeds the synchronous speed of the motors for any particular motor-speed connection. If, therefore, the motors are running at substantially 28 miles per hour, as in the assumed case, and it is desired to retard or stop by braking dynamically, the "speed drum" is moved to its second position 14 which establishes the motor connections for the 14 miles per hour operation, whereby regeneration of energy is effected until the speed has been reduced to substantially 14 miles per hour. During regeneration, the operation of the liquid rheostats is identical to that hereinbefore described, that is, the rheostats are initially empty and are subsequently filled gradually in accordance with the action of the limits HL and LL which depend upon the regenerated current.

If it is desired to regenerate further, after the speed has been reduced to substantially 14 miles per hour, the motor circuit connections are rearranged for the 7 miles per hour operating speed by moving the "speed drum" to its first position 7, after which, the automatic operation of the rheostats continues as before.

Reference may now be had to Fig. 6, in which is shown a slightly modified type of adjustable limit switch that may be found expedient to employ under certain conditions. In the figure, a limit switch $HL_a$ comprises a movable switch member 156, adapted to control the circuit of the "off magnet" or the "on magnet," a series coil $SC_6$ influenced by the motor current and a variable coil $VC_6$, the energization of which may be governed at will by the operator through the agency of a manually operated acceleration drum $AD_6$, a resistor $R_6$ and a control transformer $CT_6$. Obviously, a plurality of auxiliary coils may be used, if desired.

Although we have shown and described our invention as embodying more or less specific arrangements of circuits and apparatus of particular types, it is evident that our invention is not in any sense so restricted, as the benefits thereof may be secured by means differing widely from that herein set forth. Hence, we have intended to cover our invention in its broadest aspect in the appended claims.

We claim as our invention:

1. In a control system, the combination with a source of energy and an electric motor, of means embodying a master controller for reconnecting the motor windings for a plurality of ranges of speed, and means embodying a master controller for adjusting the rate of acceleration of said motor.

2. In a control system, the combination with a source of energy and an electric motor, of means embodying a master controller for reconnecting the motor windings for a plurality of ranges of speed, automatic means for effecting the acceleration of said motor at a uniform rate, and means for selectively adjusting the rate of acceleration.

3. In a control system, the combination with a source of energy and an electric motor, of means embodying a master controller for reconnecting the motor windings for a plurality of ranges of speed, automatic means for effecting the acceleration of said motor at a uniform rate, and selective means for influencing the operation of said automatic means.

4. In a control system, the combination with a source of energy and an electric motor, of means embodying a master controller for reconnecting the motor windings for a plurality of ranges of speed, automatic means for effecting the acceleration of said motor at a uniform rate, and a second master controller for adjusting the rate of acceleration for any speed range of motor connections.

5. In a control system, the combination with a source of energy and an electric motor, of means embodying a plurality of adjustable master controllers for governing the operation of said motor, and means associated therewith for necessitating repeated alternate manipulation of said controllers to effect continued operation of said motors.

6. In a control system, the combination with a source of energy and an electric motor, of means embodying a plurality of master controllers for governing the operation of said motor, and means associated therewith for discontinuing the operation of said motor if any one of the controllers is moved to its "off" position.

7. In a control system, the combination with a source of energy and an electric motor, of means embodying a master controller for reconnecting the motor windings for different ranges of speed, automatic means for governing the acceleration of said motor, and a second master controller for adjusting said automatic means for different rates of acceleration.

8. In a control system, the combination with a source of energy and an electric motor, of means embodying a master controller for arranging the motor connections for different ranges of speed, automatic means for governing the operation of said motor, independent means associated with said automatic means for influencing said means, and a second master controller for adjusting the action of said influencing means.

9. In a control system, the combination with a source of energy and an electric motor, of means embodying a master controller for arranging the motor connections for different ranges of speed, a limit switch for effecting automatic acceleration of said motor, an independent auxiliary coil acting conjointly with said limit switch for influencing its action, and means for adjusting the influence of said auxiliary coil.

10. In a control system, the combination with a source of energy and an electric motor, of means embodying a master controller for arranging the motor connections for different ranges of speed, a limit switch for effecting automatic acceleration of said motor, an independent auxiliary coil acting conjointly with said limit switch for adjusting the rate of acceleration, and a second master controller for changing the energization of said auxiliary coil.

11. In a control system, the combination with a source of alternating current energy, a plurality of motors connected thereto, switching means for connecting said motors in cascade with one number of poles, in parallel with the same number of poles and in parallel with another number of poles, and a master controller for governing the operation of said switching means and for causing said means to effect the motor connections, of separate means for controlling the operation of said motors.

12. In a control system, the combination with a source of alternating current energy, a plurality of motors connected thereto, switching means for connecting said motors in cascade with one number of poles, in parallel with the same number of poles and in parallel with another number of poles, and a master controller for governing the operation of said switching means and for causing said means to effect the motor connections, of a second master controller and means coöperating therewith for effecting and governing an automatic acceleration of said motors.

13. In a control system, the combination with a source of alternating current energy, a plurality of motors connected thereto, switching means for connecting said motors in different relations for different ranges of operating speeds, and means for governing the operation of said switching means, of means embodying an electro-responsive device having a coil traversed by the motor current for effecting automatic operation of said motors, a plurality of auxiliary coils associated with said electro-responsive device, and means for varying the energization of said auxiliary coils.

14. In a system of control, the combination with a source of energy, an electric motor, and means for governing the operation of said motor, of a plurality of electro-responsive devices for automatically controlling the operation of said governing means and maintaining the motor current between predetermined limits, and means for concurrently adjusting said electro-responsive devices, whereby changes in the motor current limits are effected.

15. In a control system, the combination with a source of energy, a plurality of electric motors, switching means for arranging the motor circuit connections for different ranges of operating speeds, and a master controller having a plurality of positions for selectively governing the operation of said switching means, of electro-responsive means for automatically controlling the acceleration of said motors, means associated with said master controller and dependent upon its position for affecting the action of said electro-responsive means, and a second master controller for independently influencing said electro-responsive means, whereby the rate of motor acceleration may be selected.

16. In a control system, the combination with a source of energy, a plurality of electric motors, switching means for arranging the motors for cascade and parallel operation, and a master controller for governing said switching means and determining the arrangement of motors, of automatic means for controlling the acceleration of said motors in accordance with circuit conditions, auxiliary means controlled by said controller for influencing the action of said automatic means in accordance with the arrangement of motors, and a second master controller for causing said auxiliary means to influence said automatic means, whereby the rate of motor acceleration may be selected independently of the motor arrangement.

17. In a control system, the combination with a source of energy, a plurality of motors adapted to be connected thereto, a plurality of liquid rheostats for governing the operation of said motors, and means for arranging the circuit connections of said motors and connecting said motors to said rheostats for different ranges of speed, and independently adjustable means for effecting automatic operation of said rheostats for any speed-range connection.

18. In a control system, the combination with a source of energy, a plurality of motors adapted to be connected thereto, a plurality of liquid rheostats for governing the operation of said motors, common means for regulating the level of electrolyte within said rheostats, and means for arranging the connections of said motors and for connecting said motors in cascade relation to one of said rheostats and in parallel relation to both of said rheostats, and means for governing the operation of said regulating means.

19. In a control system, the combination with a source of energy, a plurality of motors connected thereto, a plurality of liquid rheostats for governing the operation of said motors, and means for arranging the connections of said motors and for connecting said motors in cascade relation to one of said rheostats and in parallel relation to both of said rheostats, of electrically controlled means for governing the operation of said rheostats.

20. In a control system, the combination with a source of energy, a plurality of motors, a plurality of electrically operated switching devices for arranging the motor connections for different speed ranges, and manually operated means for controlling the operation of said electrically operated switching devices, of electrically controlled means for governing the operation of said motors, and manually controlled means for controlling said electrically controlled governing means.

21. In a control system, the combination with a source of energy, a plurality of polyphase induction motors, a plurality of electrically controlled switches for changing the number of poles of all of said motors, and an electrically controlled switch for connecting said motors in cascade and in parallel, of a master controller for governing the operation of said switches, and means for governing the operation of said motors.

22. In a control system, the combination with a source of energy, a plurality of polyphase induction motors, a plurality of electrically controlled switches for changing the number of poles of said motors, and an electrically controlled switch for connecting said motors in cascade and in parallel, of a master controller for governing the operation of said switches, electrically controlled rheostats for automatically governing the operation of said motors, and a master controller for adjusting the automatic operation of said rheostats.

23. In a control system, the combination with a source of energy, a plurality of polyphase induction motors, a plurality of electrically controlled switches for changing the number of poles of said motors, and an electrically controlled switch for connecting said motors in cascade and in parallel, of a master controller for governing the operation of said switches, a plurality of liquid rheostats associated with said motors, electro-responsive means for automatically controlling the operation of said rheostats, and manually selective means for adjusting said electro-responsive means for different rates of acceleration.

24. The combination with a source of energy, a plurality of polyphase electric motors, a plurality of liquid rheostats therefor, and a plurality of electrically controlled switching devices for connecting said motors in cascade and in parallel relation to one or more of said rheostats, of means for electrically controlling the operation of said rheostats.

25. The combination with a source of energy, a plurality of polyphase electric motors, a plurality of liquid rheostats therefor, and a plurality of electrically controlled switching devices for connecting said motors in cascade and in parallel relation to one or more of said rheostats, of automatic means for governing the operation of said rheostats in accordance with circuit conditions, and electrical means for selectively adjusting said automatic means.

In testimony whereof, we have hereunto subscribed our names this 16th day of June, 1914.

KARL A. SIMMON.
ARTHUR J. HALL.

Witnesses:
G. R. IRWIN,
B. B. HINES.

Copies of this patent may be obtained for five cents each, by addressing the "Commissioner of Patents, Washington, D. C."